US008632251B2

(12) United States Patent
Moratz

(10) Patent No.: US 8,632,251 B2
(45) Date of Patent: Jan. 21, 2014

(54) BEARING CLOSURE/SHIELD FOR CURRENT PASSAGE IN ELECTRIC EQUIPMENT

(75) Inventor: William Moratz, Gardiner, NY (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 148 days.

(21) Appl. No.: 13/166,652

(22) Filed: Jun. 22, 2011

(65) Prior Publication Data
US 2011/0317953 A1 Dec. 29, 2011

Related U.S. Application Data

(60) Provisional application No. 61/358,187, filed on Jun. 24, 2010.

(51) Int. Cl.
F16C 19/50 (2006.01)

(52) U.S. Cl.
USPC .......................................... 384/476

(58) Field of Classification Search
USPC .................. 384/476, 477–486; 277/500, 551; 439/17
See application file for complete search history.

(56) References Cited

U.S. PATENT DOCUMENTS

| 3,564,477 | A | * | 2/1971 | Pompei | 439/17 |
|---|---|---|---|---|---|
| 4,191,432 | A | * | 3/1980 | Miki et al. | 384/482 |
| 4,770,548 | A | * | 9/1988 | Otto | 384/478 |
| 4,856,916 | A | * | 8/1989 | Ito et al. | 384/477 |
| 5,863,135 | A | * | 1/1999 | Bildtsen et al. | 384/477 |
| 5,975,764 | A | * | 11/1999 | Okada et al. | 384/476 |
| 6,142,673 | A | * | 11/2000 | Kottritsch et al. | 384/476 |
| 6,508,591 | B2 | | 1/2003 | Niwa et al. | |
| 6,755,572 | B1 | * | 6/2004 | Kinbara | 384/462 |
| 6,860,639 | B2 | * | 3/2005 | Tabuchi et al. | 384/513 |
| 6,932,350 | B1 | * | 8/2005 | Husted | 277/421 |
| 7,498,707 | B2 | | 3/2009 | Kimura et al. | |
| 2002/0097934 | A1 | * | 7/2002 | Asai et al. | 384/484 |
| 2004/0081380 | A1 | * | 4/2004 | Katagiri et al. | 384/462 |
| 2004/0184690 | A1 | * | 9/2004 | Suzuki et al. | 384/484 |
| 2006/0126985 | A1 | * | 6/2006 | Ochi et al. | 384/625 |
| 2007/0176372 | A1 | * | 8/2007 | Racicot | 277/500 |
| 2009/0028731 | A1 | * | 1/2009 | Englander et al. | 417/423.12 |
| 2009/0148089 | A1 | * | 6/2009 | Yamamoto et al. | 384/486 |
| 2012/0223266 | A1 | * | 9/2012 | Furukoshi | 251/305 |

OTHER PUBLICATIONS

Muetze et al.; , "Current-Carrying Characteristics of Conductive Microfiber Rings for High Frequencies and Current Amplitudes," Industry Applications Society Annual Meeting, 2008. IAS '08. IEEE , vol., no., pp. 1-7, Oct. 5-9, 2008.*

* cited by examiner

Primary Examiner — Thomas R Hannon
Assistant Examiner — Kashif Mohammed
(74) Attorney, Agent, or Firm — Lucas & Mercanti, LLP

(57) ABSTRACT

At least one closure element is arranged between an outer ring and an inner ring of a bearing. The closure element aids in ensuring electric current is kept away from the rolling elements by diverting electric current from the outer ring to the inner ring of the bearing and onto a shaft of an associated machine. The closure element can take the form of either a seal or a shield. The closure element is arranged in the outer ring and contacts at least one of the notches of the inner ring. Preferably, more than one closure element is used.

17 Claims, 3 Drawing Sheets

BEARING CLOSURE/SHIELD FOR CURRENT PASSAGE IN ELECTRIC EQUIPMENT

This application claims the priority of U.S. Provisional Application No. 61/358,187 filed Jun. 24, 2010, and incorporates the same by reference.

FIELD OF INVENTION

The present invention relates to bearings and more particularly to the reduction or elimination of ground shaft electrical currents which pass through rolling elements of bearings used in high speed spindle applications, including electric motors, electric generators, and electric machines.

BACKGROUND OF THE INVENTION

Bearings used in high speed spindle applications, including electric motors, electric generators, and electric machines, are typically comprised of an inner ring and an outer ring, which each have raceways on which rolling elements roll, and cage assemblies.

The passage of electrical currents through bearings is undesirable and can cause damage to the bearing raceways and rolling elements. In some circumstances, the damage caused to bearings can ultimately lead to bearing failure. Damage caused by electric current passing through bearings commonly leads to "fluting." Fluting refers to washboard wear patterns that develop along bearing raceway surfaces in the direction of rotation as a result of a combination of the continuous flow of electric currents and vibrational properties of bearing components.

In addition to damage or failure of bearings, electrical current can affect the machines associated with the bearings. The damage caused by the passage of electric currents can be severe, causing high noise, premature failure and shutdown of a machine. Also, other machines can be affected negatively through the same stray electrical currents or even small amounts of static electricity. Significant costs and lost revenue can occur as a result of the failure of a machine. In addition to the repair costs associated with the failure of a machine, the costs are compounded by the revenue loss of the machine downtime during repair and resulting production loss.

The electrical currents which are induced onto bearings by machines are difficult to eliminate. However, damage to bearings can be prevented or at least significantly reduced by taking preventative measures. Known preventative measures include current insulating or current conducting ceramic ball bearings, ceramic coated outer bearing rings, electrical conductive grease, or a shaft seal with integrated current grounding features.

Bearings using ceramic rolling elements for insulation from electric currents are known. Ceramic has a very high resistance to passage of electric current, and thus these bearings typically exhibit a higher resistance to the passage of electric currents than standard bearings. However, ceramic rolling elements do not ensure electric currents will not lead to bearing failure. Electric currents can jump given enough potential and cause damage to the bearings. Moreover, ceramic rolling elements are expensive.

Alternatively, see, for example, U.S. Pat. No. 6,508,591, which discloses conductive ceramic rolling elements made of conductive material. There, conduction is limited to only the rolling, element, which is undesirable. Also, similar to the insulating ceramic rolling elements, the process of manufacturing a rolling element of conducting material is expensive.

Moreover, bearings utilizing ceramic coated outer rings for current insulation are known. However, the process of applying an insulating ceramic coating to the outer ring is expensive and the layer of coating can wear down. Also, insulation is limited to only the outer ring, not the entire bearing.

Bearings utilizing electrical conductive grease are also known. However, said grease has undesirable properties as a lubricant, primarily carbon particles, that interfere with the bearing function and act like contaminants. Moreover, electrical conductive grease does not provide satisfactory current conduction of electrical currents in most cases.

Additionally, see, for example, U.S. Pat. No. 7,498,707, which discloses a shaft seal with integrated current grounding utilizing dissipative brushes. There, the seal is installed, independent of the bearings, between the housing elements of a motor. The seal is not integrated into the bearings. Thus, additional space is required to include the seal in the application.

Furthermore, hearings utilizing slip rings, dissipative brushes, and non-conducting hearing closure elements, such as shields or seals, are known. However, incorporating dissipative brushes into a bearing requires the width of the bearing to be increased. Also, wear from slip rings is undesirable and must be absolutely minimized or kept away from the bearing. Finally, existing bearing closure elements do not contain current insulating or conducting features.

SUMMARY OF THE INVENTION

The present invention is directed to a bearing which includes at least one closure element, such as a seal or a shield, secured between the outer ring and the inner ring of the bearing which directs electrical current through the bearing, but not through the rolling elements. The closure element aids in ensuring electric current is kept away from the rolling elements by diverting electric current from the outer ring to the inner ring of the bearing and onto a shaft of an associated machine.

The closure element is secured between the inner ring and the outer ring of the bearing in at least one annular groove in the outer ring using a snap wire or similar means. Notches are formed in an outer face of the inner ring and provide a surface for the closure element to contact the inner ring axially. In addition to transmitting electrical current away from the rolling elements, the closure element provides protection from contaminants and the retention of lubricant(s). Moreover, the closure element can be used for high speed applications since the closure element makes only light rubbing contact with the inner ring.

One embodiment of the present invention utilizes flexeals. Flexeals typically contain two layers of material that are bonded or laminated. The inner layer is a lightweight metal, such as aluminum and the outer laminated layer is a layer of fiber. Alternatively, the outer layer can be a layer of flexible fiber with interwoven microfibers that can be independent of the inner layer.

The flexseal of the present invention incorporates a current conducting layer of material such as copper, steel, or brass. The current conducting layer is bonded on or laminated to the fiber layer on the inboard side of the seal, closest to the rolling element of the bearing. Light pressure is applied against the notch in the inner ring by the conductive layer which is maintained by slightly bending the layers of the seal axially inward. If necessary, to ensure a positive contact of the conductive layer to the outer ring, a small flexible shim can be provided between the snap ring and the outer layer of the seal. Additionally, a thin layer of lightweight metal can be fixed to the outboard side of the fiber layer to add stiffness to the seal. Preferably, two seals are used in a bearing with one seal on each side of the rolling bodies. By integrating a thin layer of conducting material onto a flexseal, a current conducting path is established from the outer ring to the inner ring, which bypasses the rolling elements.

In an alternative embodiment of the present invention shields are used. Shields are typically stamped out of stainless steel with a contoured configuration to provide strength and rigidity, resistance to vibration, and positive radial and axial positioning against the shield shoulder in the outer ring. Due to their contoured configuration, shields traditionally do not contact the inner ring.

The shields of the present invention are manufactured from a stamped metal which is current conducting. The shields have V-shaped tabs which are formed after the initial stamping of the shields is completed. The V-shaped tabs are bent inward at a shallow angle, coming to a point, and contacting only the surface of the inner ring notches. The point of contact results in minimum rubbing friction and less friction than that of existing rubber seals. Only a few V-shaped tabs are needed, which minimizes the rubbing friction. To increase the wear resistance of the electrical conducting shield, a wear resistant coating, such as Diamond Like Carbon, can be used. Preferably, two shields are used in bearings with one shield on each side of the rolling bodies.

Broadly, the present invention can be defined as a bearing comprising an outer ring which has a raceway, notches on each side of the raceway and grooves adjacent to the notches, an inner ring which has a raceway and notches on each side of the raceway, rolling bodies arranged between the raceways, a cage securing the rolling bodies, and at least one closure element arranged between the outer ring and the inner ring.

In one embodiment, the closure element is secured in at least one of the notches of the outer ring. A snap wire, is arranged in at least one of the grooves adjacent to at least one of the notches to secure the closure element in the notch. The closure can also be staked or pressed into the outer ring.

In another embodiment, the closure element is secured in each of the notches of the outer ring. A snap wire is arranged in the grooves adjacent to each of the notches to secure the closure element in each of the notches.

In an additional embodiment, the closure element is a seal. The seal has an outer layer and an inner layer. The outer layer is comprised of a flexible fiber. The inner layer is a current conducting layer, which is a current conducting metal. Alternatively, the flexible fiber includes interwoven conductive microfibers. Alternatively, the seal can include only a single layer composed of a flexible fiber with interwoven conductive microfibers.

In a further embodiment, the outer layer and the inner layer are bonded or laminated together.

In a further embodiment, the outer layer and the inner layer of the seal are bent axially inward, contacting at least one of the notches on the inner ring.

In yet another embodiment, the seal further comprises snap wire, which is arranged in at least one of the grooves adjacent to the notches to secure the seal in the at least one of the notches and a flexible shim located between the snap wire and the outer layer of the seal to ensure a positive contact of the inner layer of the seal to the outer ring.

In another embodiment, two seals are included. The seals are located on opposite sides of the rolling bodies.

In a further embodiment, the bearing further comprises an additional thin stiffener layer of metal, such as aluminum, on an outboard side of the outer layer.

In yet an even further embodiment, the closure element is a shield. The shield is made of a current conducting metal. The shield has V-shaped tabs which are bent inward at a shallow angle, coming to a point, and contacting a surface of at least one of the notches of the inner ring.

In another embodiment, two shields are included. The shields are located on opposite sides of the rolling bodies.

In a further embodiment, to increase wear resistance of the shield, a wear resistant coating is used. The wear resistant coating is a Diamond Like Carbon.

BRIEF DESCRIPTION OF THE DRAWINGS

The present invention will be further understood and appreciated by reading the following description in conjunction with the accompanying drawings, in which.

DETAILED DESCRIPTION OF THE INVENTION

Figure 1:
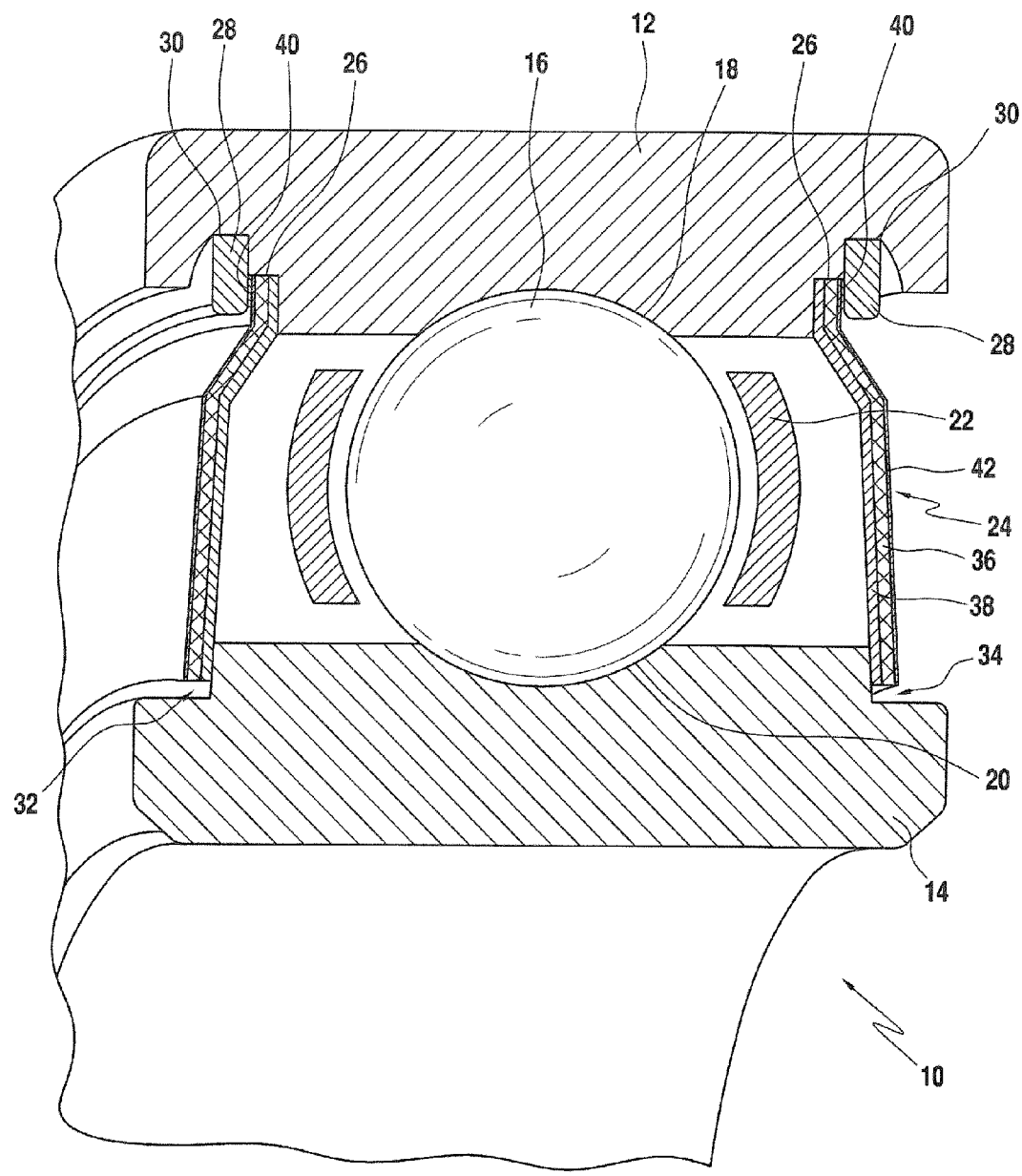
FIG. 1 is a cross-sectional view of a seal with a current conducting layer.

Referring now to the drawings, in which like reference numerals refer to like reference parts throughout, FIG. 1 shows a cross-sectional view of a bearing 10. Between an outer ring 12 and an inner ring 14 of the bearing 10 are rolling elements 16, which roll on raceways 18, 20 and are secured by a cage 22. The rolling elements 16 are protected from electrical currents by a seal 24 that is secured in a notch 26 in the outer ring 12 using a snap wire 28 or similar means that is fixed in a groove 30 adjacent to the seal 24. The inner ring 14 has notches 32, 34 on each side of the raceway 20 against which the seal 24 contacts. The seal 24 aids in ensuring that electric current is kept away from the rolling elements 16 by diverting electric current from the outer ring 12 to the inner ring 14 of the bearing 10 and onto a shaft of an associated machine (not shown).

The seal 24 is comprised of two layers of material 36, 38 that are bonded or laminated together. The outer layer 36 is comprised of a flexible fiber. The inner layer 38 is comprised of a current conducting material such as copper, steel, or brass. The inner layer 38 is bonded on or laminated to the outer layer 36 on the inboard side of the seal 24, closest to the rolling element 16 of the bearing 10. Light pressure is applied against the notches 32, 34 in the inner ring 14 by the inner layer 38. Preferably, two seals 24 are used with one seal 24 on each side of the rolling elements 16. If necessary, to ensure a positive contact of the inner layer 38 to the outer ring 12, a small flexible shim 40 can be provided between the snap wire 28 and the outer layer 36 of the seal 24. Additionally, a thin stiffener layer of metal 42, such as aluminum, could be added to the outboard side of the outer layer 36 of fiber. By integrating a thin layer of conducting material 38 onto the seal 24, a current conducting path is established from the outer ring 12 to the inner ring 14, which bypasses the rolling elements 16.

Figure 2:
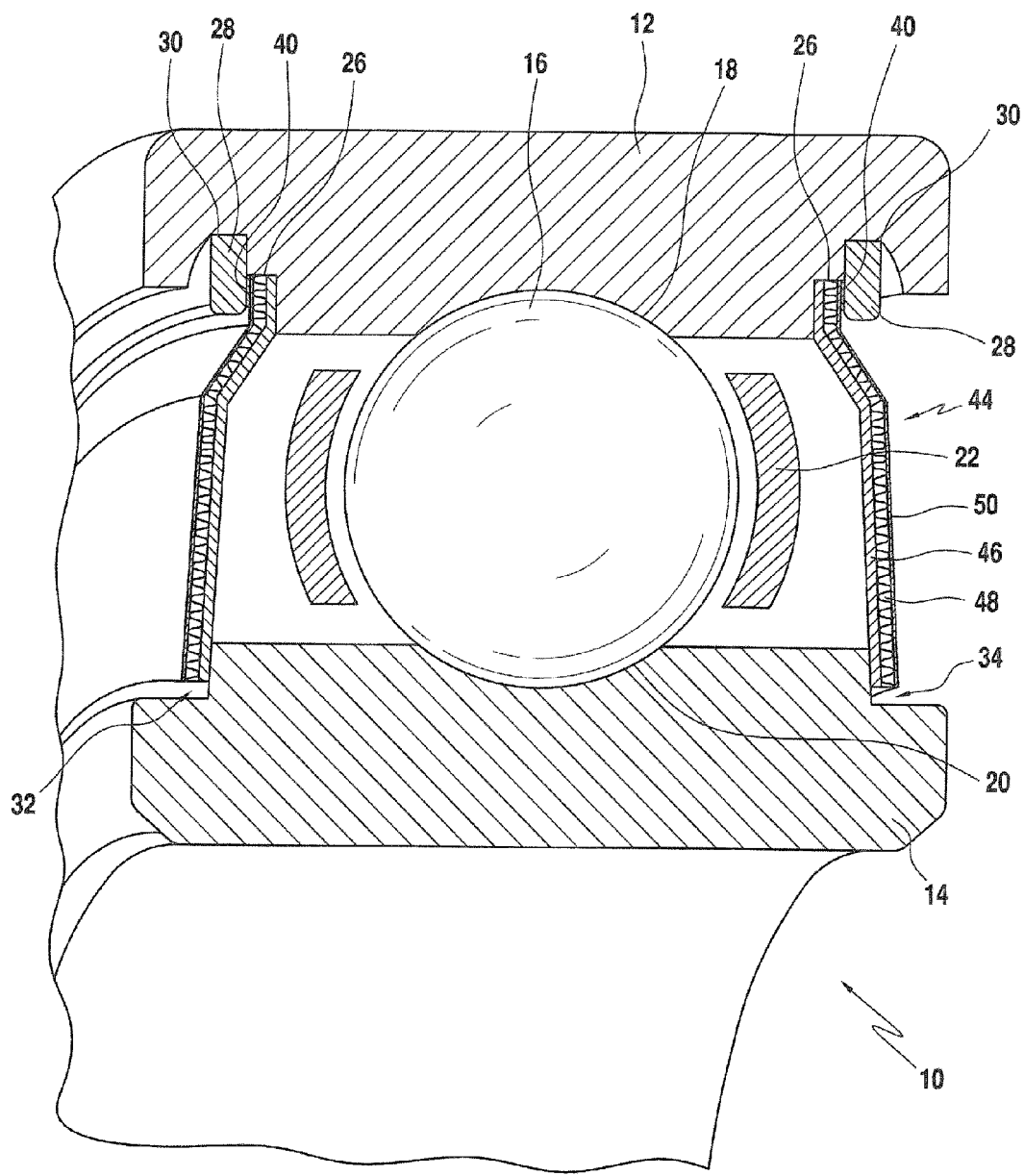
FIG. 2 is a cross-sectional view of a shield with a with interwoven conductive microfibers.

FIG. 2 shows a cross-sectional view of an alternate embodiment of the seal 24 of FIG. 1. The seal 44 in FIG. 2 is comprised of two fiber layers of material 46, 48. The outer layer 48 is comprised of interwoven embedded conductive wire microfibers, such as fine copper. The inner layer 46 is comprised of a current conducting material such as copper, steel, or brass. The inner layer 46 can be bonded on or laminated to the inboard side of the outer layer 48, closest to the rolling element 16 of the bearing 10 so as to contact the outer ring 14 and the inner ring 16. Light pressure is applied against the notches 32, 34 in the inner ring 14 by the inner layer 46. As shown, two seals 44 are used with one of the seals 44 on each side of the rolling elements 16. If necessary, to ensure a positive contact of the inner layer 46 to the outer ring 12, a small flexible shim 40 can be provided between the snap wire 28 and the outer layer 48 of the seal 44. Additionally, a thin stiffener layer of metal (not shown), such as aluminum, could be added to the outboard side of the outer fiber layer 48. By integrating a thin layer of conducting material 46 in the seal 44, a current conducting path is established from the outer ring 12 to the inner ring 14, which bypasses the rolling elements 16.

Alternatively, the seal can be comprised of only the outer layer 48. When only the Outer layer 48 is installed, the microfibers act as a stiffener.

Figure 3:
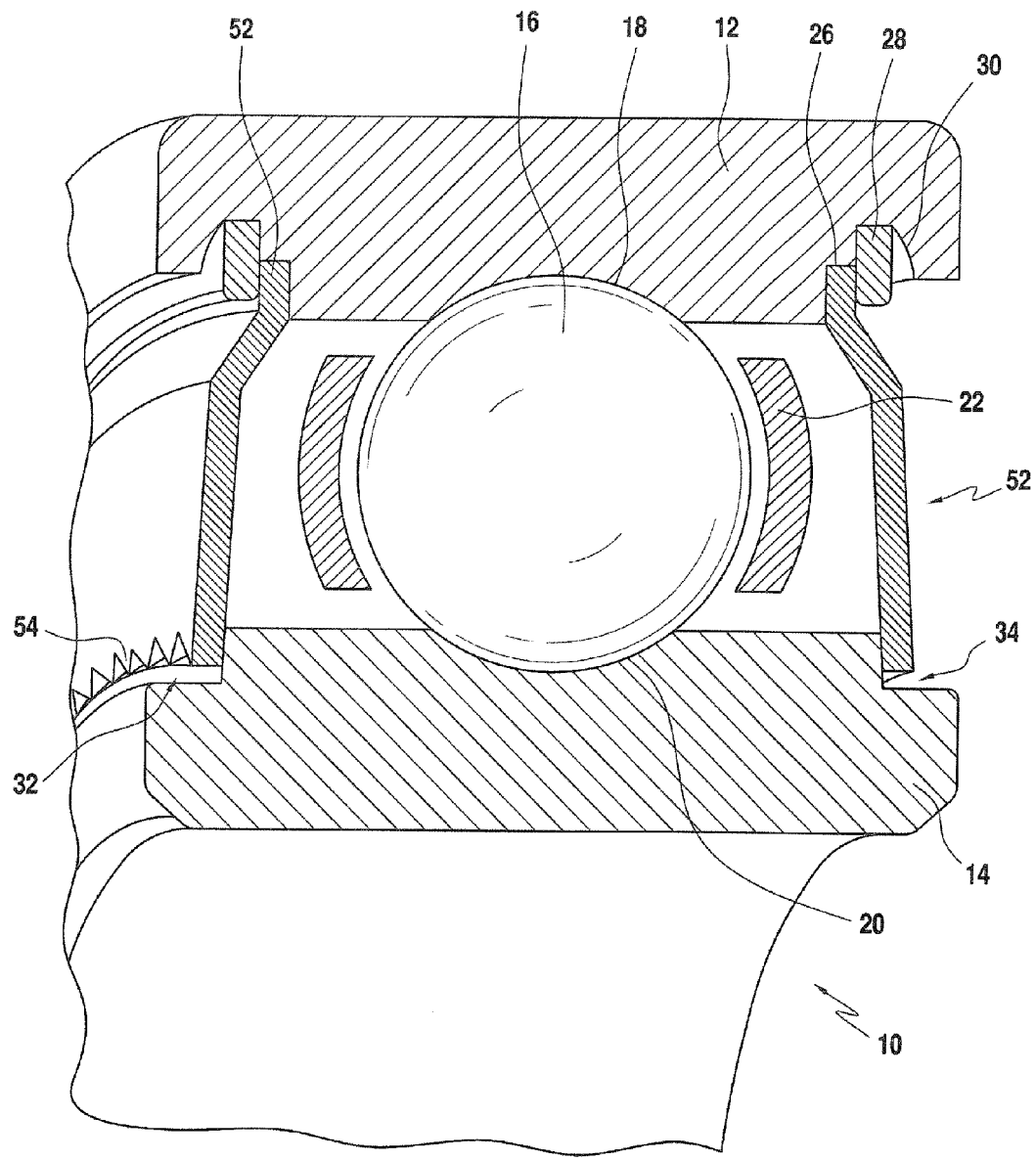
FIG. 3 is a cross-sectional view of a shield which has current conducting properties.

FIG. 3 shows a cross-sectional view of an electrical conducting shield 52 arranged in the bearing 10. The shield 52 is manufactured from a stamped metal, which is current conducting and has V-shaped tabs 54, which are formed after the initial stamping of the shield 52 is completed. The V-shaped 54 tabs are bent inward at a shallow angle, coming to a point, and contacting only the surface of the inner ring notches 32, 34. Only a few V-shaped tabs 54 are needed, which minimizes the rubbing friction. To increase the wear resistance of the electrical conducting shield 54, a wear resistant coating, such as Diamond Like Carbon, can be used. Preferably, two shields 52 are used with one of the shields 52 being arranged on each side of the rolling elements 46.

The present invention has been described with reference to a preferred embodiment. It should be understood that the scope of the present invention is defined by the claims and is not intended to be limited to the specific embodiment disclosed herein.

REFERENCE CHARACTERS

10 Bearing
12 Outer Ring
14 Inner Ring
16 Rolling Elements
18 Raceway
20 Raceway
22 Cage
24 Seal
26 Notch
28 Snap Wire
30 Groove
32 Notch
34 Notch
36 Outer Layer
38 Inner Layer
40 Flexible Shim
42 Stiffener Layer
44 Seal
46 Inner Layer of Fiber Material
48 Outer Layer of Fiber Material
50 Stiffener Layer
52 Shield
54 V-Shaped Tabs

What is claimed:

1. A bearing, comprising:
an outer ring having a raceway, notches on each side of the raceway and grooves adjacent to the notches;
an inner ring having a raceway and notches on each side of the raceway;
rolling bodies arranged between the raceways;
a cage securing the rolling bodies in place; and
at least one conductive closure element arranged between the outer ring and the inner ring, wherein the closure element is a seal composed of flexible fiber with interwoven conductive microfibers.

2. The bearing of claim 1, wherein the closure element is secured in at least one of the notches of the outer ring.

3. The bearing of claim 2, further comprising a snap wire arranged in at least one of the grooves adjacent to the notches to secure the closure element in the at least one of the notches.

4. The bearing of claim 3, further comprising snap wire arranged n both of the grooves adjacent to the notches to secure the closure elements in each of the notches.

5. The bearing of claim 1, wherein the bearing has two closure elements, which are secured in each of the notches of the outer ring.

6. The bearing of claim 1, wherein the closure elements staked or pressed into the outer ring.

7. The bearing of claim 1, wherein the closure element is a shield made of a current conducting metal.

8. A bearing, comprising:
an outer ring having a raceway, notches on each side of the raceway and grooves adjacent to the notches;
an inner ring having a raceway and notches on each side of the raceway;
rolling bodies arranged between the raceways;
a cage securing the rolling bodies in place; and
at least one conductive closure element arranged between the outer ring and the inner ring, wherein the closure element is a seal having an outer layer and an inner layer, the outer layer and the inner layer being bonded or laminated together, and the outer layer being comprised of a flexible fiber and the inner layer being a current conducting metal layer, wherein the flexible fiber includes interwoven conductive microfibers.

9. The bearing of claim 8, wherein the outer layer and the inner layer of the seal are bent axially inward, contacting at least one of the notches on the inner ring.

10. The bearing of claim 8, further comprising snap wire, which is arranged in at least one of the grooves adjacent to the notches to secure the seal in the at least one of the notches and a flexible shim located between the snap wire and the outer layer of the seal to ensure a positive contact of the inner layer of the seal to the outer ring.

11. The bearing of claim 8, wherein the bearing has two seals, which are located on opposite sides of the roiling bodies.

12. The bearing of claim 8, further comprising an additional thin stiffener layer of metal on an outboard side of the outer layer.

13. A bearing, comprising:
an outer ring having a raceway, notches on each side of the raceway and grooves adjacent to the notches;
an inner ring having a raceway and notches on each side of the raceway;
rolling bodies arranged between the raceways;
a cage securing the rolling bodies in place; and
at least one conductive closure element arranged between the outer ring and the inner ring, the closure element being a shield made of a current conducting metal, wherein the shield has V-shaped tabs which are bent toward the rolling bodies, the V-shaped tabs corning to a point and contacting a surface of at least one of the notches of the inner ring.

14. The bearing of claim 13, wherein the bearing has two shields located on opposite sides of the rolling bodies.

15. The bearing of claim 13, wherein the shield has a wear resistant coating.

16. The bearing of claim 15, wherein the wear resistant coating is Diamond Like Carbon.

17. The bearing of claim 13, wherein the shield is made of a stamped current conducting metal.

* * * * *